United States Patent
Hoshino et al.

(10) Patent No.: US 6,376,046 B1
(45) Date of Patent: Apr. 23, 2002

(54) CLEANING ARTICLE IMPREGNATED WITH DETERGENT

(75) Inventors: Eiichi Hoshino; Koji Hanaoka; Fumiko Inaba; Kazuo Mori; Kenji Ishikawa; Hironobu Sionome, all of Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/341,270

(22) PCT Filed: Jan. 23, 1998

(86) PCT No.: PCT/JP98/00274

§ 371 Date: Jul. 7, 1999

§ 102(e) Date: Jul. 7, 1999

(87) PCT Pub. No.: WO98/33425

PCT Pub. Date: Aug. 6, 1998

(30) Foreign Application Priority Data

Jan. 31, 1997 (JP) ............................................. 9-19231

(51) Int. Cl.$^7$ ................................................. C08J 9/28
(52) U.S. Cl. ...................... 428/156; 428/118; 428/174; 428/178; 428/218; 510/395
(58) Field of Search ................................. 428/118, 174, 428/178, 218, 156; 510/395

(56) References Cited

U.S. PATENT DOCUMENTS

| | | | |
|---|---|---|---|
| 4,287,251 A | 9/1981 | King et al. | 428/198 |
| 4,775,582 A | 10/1988 | Abba et al. | 428/288 |
| 4,793,280 A | 12/1988 | Menard et al. | 118/44 |
| 4,797,310 A | 1/1989 | Barby et al. | 428/71 |
| 5,468,418 A | * 11/1995 | Rabone | 252/174.25 |
| 5,507,968 A | 4/1996 | Palaikis | 252/90 |
| 5,814,567 A | 9/1998 | Yahiaoui et al. | 442/118 |

FOREIGN PATENT DOCUMENTS

| | | |
|---|---|---|
| EP | 353014 | 1/1990 |
| GB | 1576228 | 10/1980 |
| GB | 2125277 | 3/1984 |
| JP | 3141383 | 6/1991 |
| JP | 515481 | 1/1993 |

OTHER PUBLICATIONS

Isogai Takeshi, JP 05 015481 A, Jan. 26, 1993, Patent Abstracts of Japan Abstract Only.

* cited by examiner

Primary Examiner—Blaine Copenheaver
Assistant Examiner—Alicia Chevalier
(74) Attorney, Agent, or Firm—Birch, Stewart, Kolasch & Birch, LLP

(57) ABSTRACT

A cleaning article comprising a detergent-retaining layer containing a hydrophobic material and detergent gradual-releasing layers having a higher density than the detergent-retaining layer, and the detergent-retaining layer is sandwiched between the detergent gradual-releasing layers.

9 Claims, 3 Drawing Sheets

CLEANING ARTICLE IMPREGNATED WITH DETERGENT

This application is the national phase under 35 U.S.C. § of PCT International Application No. PCT/JP98/00274 which has an International filing date of Jan. 23, 1998, which designated in the United States of America.

1. Technical Field

The present invention relates to a cleaning article used by impregnating a detergent for cleaning surfaces of glass, etc. More particularly, the present invention relates to a cleaning article which can release a proper amount of a detergent for each wipe and exhibit excellent detergency by controlling the amount of the impregnated detergent released to increase the utilization efficiency of the detergent and thus capable of cleaning a larger area. The present invention also relates to a detergent-impregnated article comprising the cleaning article and a detergent impregnated therein.

2. Background Art

Cleaning sheets impregnated with a detergent component are disclosed, for example, in Japanese Patent Laid-Open No. 2-84926 which corresponds to EP-A-353014 and Japanese Patent Laid-Open No. 5-15481.

Japanese Patent Laid-Open No. 2-84926 proposes a wiping article suitable for use in cleaning soiled surfaces in the presence of water, which comprises a first substrate layer, a second substrate layer, and a surface active agent in solid form held in between these two base layers. On each of the facing sides of the first and second base layers is provided with a discontinuous coating layer comprising polyethylene, which serves to retard oozing of the surface active agent in solid form out of the wiping article.

Japanese Patent Laid-Open No. 5-15481 describes a cleaner for a smooth surface, which comprises a cleaning cloth having a dirt-catching fiber layer made up of ultrafine fibers or divided fibers and a liquid-absorbing fiber layer, and a cleaning agent containing a solvent impregnated into the cloth.

These conventional cleaning articles have the following disadvantages.

The problem of the wiping article according to Japanese Patent Laid-Open No. 2-84926 is that it is incapable of cleaning a hard surface unless there is a large amount of water on the surface to be cleaned because it has no liquid detergent therein but the surface active agent in solid form that is held inside the article and is to be gradually dissolved and released by means of externally supplied water.

In the cleaner for a smooth surface disclosed in Japanese Patent Laid-Open No. 5-15481 no discussion or appreciation for gradual release of the impregnated detergent is given. Therefore, a problem is that a single wipe with the cleaner tends to release more detergent than necessary onto the surface to be cleaned and, as a result, it is difficult to clean a large area with this cleaner. The liquid-absorbent fiber layer of this cleaner comprises hydrophilic fibers such as rayon, pulp and cotton.

DISCLOSURE OF THE INVENTION

Accordingly, an object of the present invention is to provide a cleaning article used by impregnating a detergent which releases the detergent impregnated therein uniformly and ensures increased utilization efficiency of the detergent. Further, an object of the present invention to provide a cleaning article used by impregnating a detergent which exhibits high cleaning power over a large area with a proper amount of a detergent without using water.

As a result of extensive investigations, the present inventors have found that the above object is accomplished by a cleaning article used by impregnating a detergent comprising a detergent-retaining layer and specific detergent gradual-releasing layers, these layers being laminated in a specific structure.

The present invention has been discovered based on this finding. That is, the above object is accomplished by providing a cleaning article comprising a detergent-retaining layer containing a hydrophobic material and detergent gradual-releasing layers having a higher density than said detergent-retaining layer, said detergent-retaining layer being sandwiched between said detergent gradual-releasing layers.

The present invention is also provide a detergent-impregnated article comprising a cleaning article and a detergent impregnated in said cleaning article, said cleaning article comprising a detergent-retaining layer containing a hydrophobic material and a detergent gradual-releasing layers having a higher density than said detergent-retaining layer, said detergent-retaining layer being sandwiched between said detergent gradual-releasing layers.

THE BEST MODE FOR CARRYING OUT THE INVENTION

Figure 1:
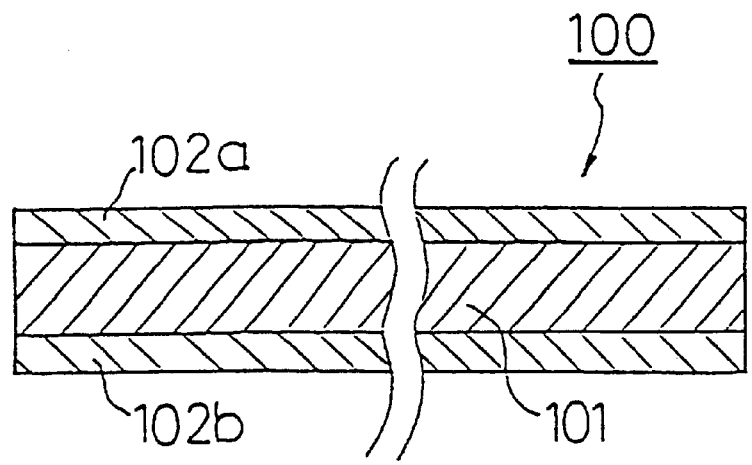
FIG. 1 is a schematic cross section showing the structure of one embodiment of a cleaning article used by impregnating a detergent according to the present invention.
Figure 2:
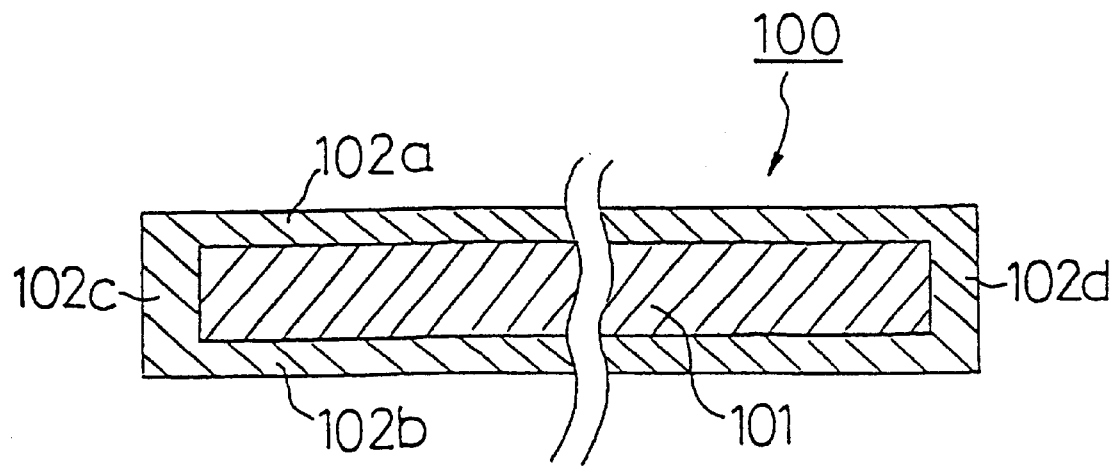
FIG. 2 is a schematic cross section showing the structure of another embodiment of a cleaning article used by impregnating a detergent according to the present invention.

Preferred embodiments of the cleaning article according to the present invention are described below with reference to the accompanying drawings. FIG. 1 is a schematic cross section showing the structure of an embodiment of the cleaning article of the present invention. FIG. 2 is a schematic cross section showing the structure of another embodiment of the cleaning article of the present invention.

The cleaning article 100 shown in FIG. 1 is in a sheet form having a detergent-retaining layer 101 (hereinafter simply referred to as a retaining layer) and a pair of detergent gradual-releasing layers 102a and 102b in a sheet form (hereinafter simply referred to as a releasing layer(s)) which are provided on the upper and lower surfaces of the retaining layer 101, holding the retaining layer 101 therebetween.

The cleaning article 100 shown in FIG. 2 is also in a sheet form, comprising a retaining layer 101 of sheet form, a pair of releasing layers 102a and 102b which are provided on the upper and lower surfaces of the retaining layer 101 to hold the retaining layer 101 therebetween, and a pair of releasing layers 102c and 102d which are provided on both sides of the retaining layer 101 to hold the retaining layer 101 from the sides. The releasing layers 102a, 102b, 102c, and 102d are made of a single continuous sheet, enclosing the retaining layer 101 therein.

The retaining layer 101 is capable of retaining a large quantity of a detergent and, to perform such a function, contains a low-density and a bulky hydrophobic material having a high retention capacity. It should be noted that not all the constituent materials of the retaining layer need to be hydrophobic, and part of the retaining layer can be made of a hydrophilic material provided that the retaining layer as a whole exhibits hydrophobic properties. It is desirable that the proportion of hydrophilic materials in the total weight of the retaining layer be not more than 30%. Materials constituting the retaining layer 101 include a fiber aggregate comprising hydrophobic fibers as major components, or a hydrophobic flexible porous body, and the like. The retaining layer 101 containing a hydrophobic material preferably exhibits hydrophobic properties as a whole. One method for evaluating the hydrophobic properties of the retaining layer as a whole is as follows.
Evaluation the hydrophobic properties of the retaining layer The retaining layer is pretreated by a mixed organic solvent of ethanol and chloroform (50/50 parts by weight) with Soxhlet's extractor to remove fiber-treating agents such as various oils.

Then, the retaining layer is cut into a 10 cm×10 cm specimen and the specimen is gently put onto the surface of the ion-exchanged water which is put in a container. The time until the specimen sinks in the ion-exchanged water is measured. The retaining layer which is present on the surface of the ion-exchanged water 7 seconds or longer is judged as having hydrophobic properties.

It is also possible to evaluate the hydrophobic properties of the retaining layer in the cleaning article, i.e., the retaining layer being sandwiched between the releasing layers and not separated from these layers. In this case, the cleaning article is divided at the retaining layer into two pieces. Then, the piece is pretreated as described above to obtain a specimen and the specimen is put onto the surface of the ion-exchanged water in such a manner that the side of the retaining layer in the specimen is brought into contact with the surface.

Where the retaining layer comprises the fiber aggregate comprising hydrophobic fibers as major components, the fiber aggregate includes wet-processed nonwoven fabric, dry-processed nonwoven fabric, woven fabric, and knitted fabric. Nonwoven fabric is preferred for its processability and cost. The expression "comprising hydrophobic fibers as major components" as used herein is intended to mean that the retaining layer exhibits hydrophobic properties as a whole.

Examples of the hydrophobic fibers are polyolefin fiber, such as polyethylene (PE) and polypropylene (PP); polyester fiber such as polyethylene terephthalate; polyamide fiber such as nylon; polyacrylonitrile fiber, polyvinyl alcohol fiber, and mixtures thereof. Conjugated fibers comprising these fibers such as core/sheath type fiber and side-by-side type fiber, can be also useful. Alternatively, hydrophilic fibers which have been rendered hydrophobic can be used.

Nonwoven fabric for use as the fiber aggregate is not particularly limited by the process of production. Useful nonwoven fabrics include wet-processed fabrics that are manufactured from hydrophobic fibers and pulp by a paper making system; and dry-processed fabrics, such as thermally bonded nonwoven fabrics obtained by bonding fibers by autohesion or via adhesive fibers (e.g., an air through nonwoven fabric, an aid laid nonwoven fabric, and a heat roll bonded nonwoven fabric), a chemical bonded nonwoven fabric obtained by bonding a fiber web with an adhesive, a needle punched nonwoven fabric obtained by needling a web with a special needle to give entanglement, a spun laced nonwoven fabric obtained by entangling fibers by a high pressure water jet, a melt blown nonwoven fabric obtained by bonding ultrafine fibers without binders, a spun bonded nonwoven fabric obtained directly from spinning nozzles in which fibers are bonded mainly by autohesion, and a flash spun nonwoven fabric.

Specific examples of the nonwoven fabric are air through nonwoven fabric comprising PP/PE core/sheath type conjugated fibers, spun bonded nonwoven fabric comprising PP fibers, embossed fabric of these nonwoven fabrics, and air laid nonwoven fabric.

Figure 3A:
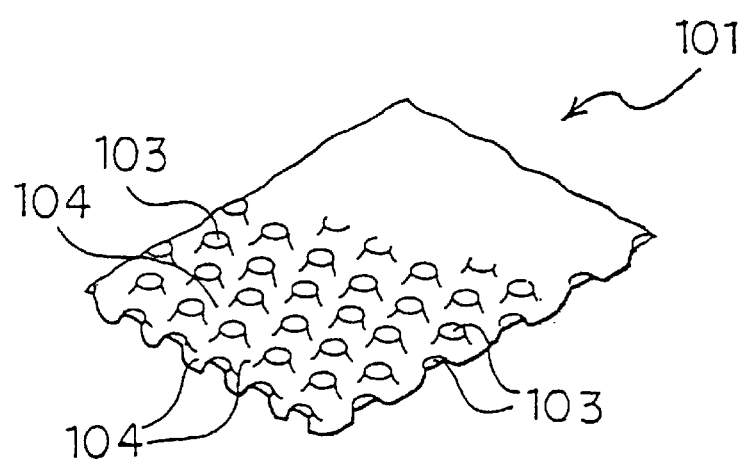
FIG. 3(a) and FIG. 3(b) are a perspective view and a cross section, respectively, showing hydrophobic nonwoven fabric having a plurality of convex and concave portions regularly arranged thereon as an example of a detergent retaining layer of the cleaning article of the present invention.
Figure 3B:
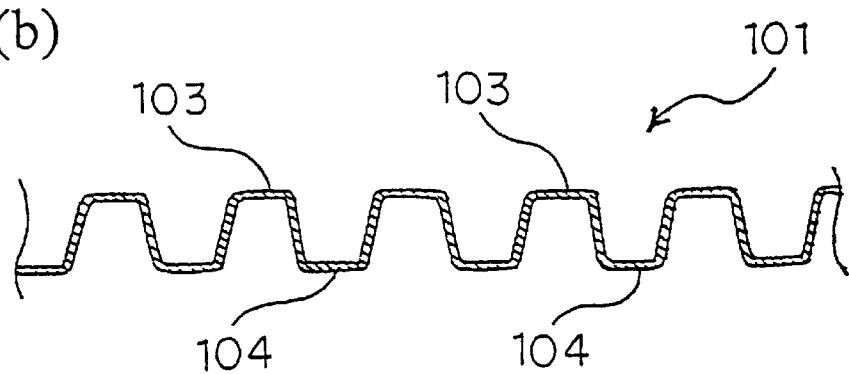

It is also possible to use, as the retaining layer 101, a hydrophobic nonwoven fabric which is subjected to an embossing treatment of heated rollers using a pair of engraved rollers each having a convexo-concave surface thereby to form a plurality of alternate convex portions 103 and concave portions 104 regularly arranged over its entire surface, as shown in FIG. 3(a) and FIG. 3(b). The convex portions 103 are in a generally conical trapezoid form, while the concave portions 104 are in a generally reverse conical trapezoid form corresponding to the form of the convex portions 103.

Figure 4:
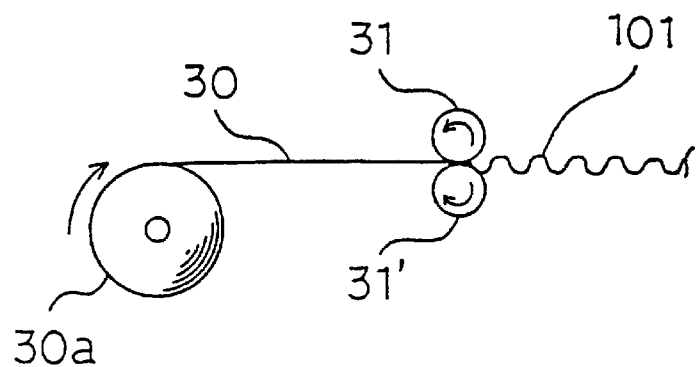
FIG. 4 is schematically illustrates a method for producing a detergent retaining layer shown in FIG. 3.

The retaining layer as shown in FIG. 3(a) and FIG. 3(b) is formed in accordance with the followings steps. First, as shown in FIG. 4, a stock web of hydrophobic nonwoven fabric 30 comprising a fiber aggregate is unrolled out of a roll 30a, and the unrolled nonwoven fabric is inserted in between a pair of engraved rollers 31, 31' each having a convexo-concave surface. The rollers 31, 31' each have a plurality of regularly arranged convex and concave patterns engraved over the entire surface, and the convex and concave patterns engage with each other when the rollers rotate in the arrow-indicated direction in FIG. 4. The nonwoven fabric 30 are inserted between the engaged rollers 31, 31' thereby forming the convex portions 103 and concave portions 104 on the nonwoven fabric 30. Thus, the retaining layer 101 is formed. Either one or both of the rollers 31, 31' can be heated roller(s) in accordance with fiber materials constituting the nonwoven fabric 30. Depending upon the fiber materials, the heating temperature is preferably 100to 150° C. in general. The pressure between the rollers 31, 31' can be within the range sufficient for forming the convex portions 103 and concave portions 104 on the nonwoven fabric 30. Such an embossing treatment is generally known, for example, as steel matched embossing.

Where the retaining layer comprises the hydrophobic flexible porous body, it includes plastic foamed bodies (spongy structures) made of natural or synthetic polymers or resins. These polymers or resins may be subjected to a hydrophobic treatment, if necessary.

The resins include cellulose resins, synthetic resins, and mixtures of two or more thereof. The cellulose resins include viscous rayon and acetates. The synthetic resins include polyolefin resins such as polyethylene and polypropylene; polyester resins such as polyethylene terephthalate; polyamide resins such as nylon; polyacrylonitrile resins, polyvinyl alcohol resins, and urethane resins.

The retaining layer preferably has a density of 0.005 to 0.5 g/cm$^3$, particularly 0.008 to 0.1 g/cm$^3$, especially 0.01 to 0.08 g/cm$^3$, under a load of 2.5 g/cm$^2$ so as to have an increased capacity of retaining a detergent. If the density is less than 0.005 g/cm$^3$, retaining layer is so bulky that the detergent retaining power may be reduced and the detergent retention capacity may tend to be small. If the density exceeds 0.5 g/cm³, insufficient bulkiness may have a reduced detergent retention capacity, or the detergent retaining power may tend to be too high to let the detergent migrate to the releasing layer. Accordingly, the above range is preferred.

The retaining layer preferably has a basis weight of 5 to 300 g/m², particularly 10 to 250 g/m², especially 15 to 200 g/cm². If the basis weight is less than 5 g/m², the retaining layer, with its density being in a proper range, is too thin to have sufficient detergent retaining capacity, may not be impregnated with a sufficient amount of a detergent. If the basis weight is more than 300 g/m², the retaining layer, with its density being within a proper range, is too thick, tending to have poor processability, and the resulting cleaning article may tend to have poor workability in cleaning operation. Accordingly, the above range of the basis weight is preferred.

Next, the releasing layer will be described. The releasing layer functions to supply a detergent, which is retained in the retaining layer and released therefrom, to a surface to be cleaned gradually and almost thoroughly. To perform such a function, the releasing layer is made of a material having a higher density than the retaining layer.

The material making up the releasing layer includes hydrophilic materials, for example, a fiber aggregate comprising hydrophilic fibers as major components. It should be noted that not all the constituent materials of the releasing layer need to be hydrophilic. Accordingly, in saying that the releasing layer is made of hydrophilic materials, a hydrophobic material can be included therein as far as the releasing layer as a whole exhibits hydrophilic properties. It is desirable that the proportion of hydrophobic materials, if any, in the total weight of the releasing layer be not more than 70%. The expression "comprising hydrophilic fibers as major components" as used herein is intended to mean that the releasing layer exhibits hydrophilic properties.

It is also possible to use a fiber aggregate comprising as major components hydrophobic ultrafine fibers having a fiber diameter of not greater than 10 μm. The expression "comprising as major components hydrophobic ultrafine fibers" as used herein is intended to mean that the releasing layer exhibits hydrophobic properties. It is desirable that the proportion of hydrophilic material in the total weight of the releasing layer be not more than 30%.

The fiber aggregate comprising the hydrophilic fibers or ultrafine fibers includes paper, wet-processed or dry-processed nonwoven fabric, woven fabric, and knitted fabric. From the viewpoint of processability and cost, paper and nonwoven fabric are preferably used.

The hydrophilic fibers include cellulose fibers such as natural fibers, for example, wood pulp, cotton and flax, and cellulosic chemical fibers such as viscous rayon, TENCEL™ and acetates Hydrophobic synthetic fibers having been rendered hydrophilic by a surface treatment can also be employed.

Where paper is used as the fiber aggregate comprising the hydrophilic fibers, it can be any of a wet-processed pulp sheet produced from pulp by a paper making system, a wet-processed binder sheet prepared by applying a binder to paper to increase the wet strength, and a dry-processed pulp sheet prepared by adhering scattered and laid fibers with a binder into a sheet. Where nonwoven fabric is used as the fiber aggregate comprising the hydrophilic fibers, it includes various kinds of nonwoven fabric produced from cellulose fibers such as cotton and pulp, either individually or as a mixture thereof (wet-processed nonwoven fabric and dry-processed nonwoven fabric such as thermal bonded nonwoven fabric, chemical bonded nonwoven fabric, needle punched nonwoven fabric, and spun laced nonwoven fabric).

On the other hand, the fiber aggregate comprising hydrophobic ultrafine fibers as major components includes melt blown nonwoven fabric obtained by bonding, without binders, ultrafine fibers having a fiber diameter of not greater than 10 μm, preferably 5 μm or less, still preferably 3 μm or less, a laminate of such melt blown nonwoven fabric and spun bonded nonwoven fabric, and other fiber aggregates of various ultrafine fibers such as divided fibers.

The releasing layer should have a higher density than that of the retaining layer and preferably has a density of 0.01 to 1.0 g/cm³, particularly 0.05 to 0.5 g/cm³, especially 0.1 to 0.3 g/cm³, under a load of 2.5 g/cm². If the density is less than 0.01 g/cm³, the releasing layer may tend to release too much detergent to sufficiently perform the function of gradually releasing the detergent. If the density is more than 1.0 g/cm³, the amount of the released detergent may tend to be too small to exhibit sufficient detergency. Thus, the above density range is preferred.

In order to make the detergent retained in the retaining layer efficiently migrate to the releasing layer, the difference in density between the releasing layer and the retaining layer is (the former-the latter) preferably 0.005 to 0.95 g/cm³, still preferably 0.01 to 0.5 g/cm³.

The releasing layer preferably has a basis weight of 1 to 200 g/m², particularly 5 to 150 g/m², especially 10 to 100 g/cm² per layer. If the basis weight is less than 1 g/m², the releasing layer, with its density being in a proper range, is so thin that it may tend to release too much detergent, failing to manifest sufficient gradual releasing properties, or may tend to be too weak to secure sufficient processability or workability. If the basis weight exceeds 200 g/m², the releasing layer may tend to trap the detergent, failing to release an adequate amount of the detergent. Thus, the above range is preferred.

The releasing layers 102a and 102b shown in FIG. 1 and 102a to 102d shown in FIG. 2 may be the same or different in material, density and basis weight.

The total basis weight of the cleaning article is selected appropriately so as to satisfy the above-specified impregnation capacity. From the standpoint of processability, cost, and handling efficiency, the basis weight of the cleaning article is preferably 7 to 700 g/m², still preferably 20 to 550 g/m², particularly preferably 35 to 400 g/m².

The means for joining the retaining layer and the releasing layers is not particularly limited. Useful means include thermal bonding, simultaneous forming on a paper machine, adhesion with an adhesive, sewing, and entanglement between the fibers constituting the retaining layer and the fibers constituting the releasing layer. Thermal bonding is a preferred joining means in view of processability and durability. The joint pattern in thermal bonding is not particularly limited and includes dots and lines.

When using the cleaning article of the present invention, the detergent can be released in a controlled amount and supplied to a surface to be cleaned in a constant amount until most of the detergent is consumed. Thus, the detergent can be utilized at an extremely high efficiency. The utilization efficiency of the detergent will be hereinafter referred to as a rate of release, as defined by the following equation (1).

$$\text{Rate of release}(\%) = (\text{Total weight of released detergent})/(\text{Initial weight of impregnated detergent}) \times 100 \tag{1}$$

More specifically, because the retaining layer is less dense and more bulky than the releasing layer, it is capable of retaining a large quantity of a detergent. In addition, because of its hydrophobic property, it easily releases the detergent toward the releasing layer upon receipt of an outer pressure. The rate of release of the detergent can thus be increased.

On the other hand, because the releasing layer is denser than the retaining layer, the detergent released from the retaining layer is prevented from being supplied to a surface to be cleaned at one time. That is, the detergent is not released in a large quantity all at once, but is gradually released. Particularly where the releasing layer is a fiber aggregate comprising hydrophilic fibers as major components or a fiber aggregate comprising as major components hydrophobic ultrafine fibers having a fiber diameter of 10 $\mu$m or smaller, since the releasing layer can absorb a detergent by the action of the polarity or capillary action of the fibers, the detergent is prevented from being released in a large quantity at one time but is gradually released.

In this way, the cleaning article of the present invention has achieved both gradual releasing properties for supplying a proper amount of a detergent and an excellent rate of release, in the case of using it by impregnating the detergent.

The present invention provides a detergent-impregnated article comprising the above cleaning article and a detergent impregnated therein. Because the above cleaning article is used in the detergent-impregnated article, a proper amount of the detergent is gradually released from the detergent-impregnated article with an excellent rate of release in cleaning operation.

The detergent which is impregnated into the cleaning article is not particularly limited in kind as far as it is capable of removing dirt on a surface to be cleaned. For example, detergents mainly comprising water and containing alcohols or surface active agents, etc. can be used.

It is preferable that the detergent be impregnated into the cleaning article to an amount of 50 to 5000% by weight, particularly 100 to 3000% by weight, especially 200 to 2000% by weight based on the weight of the cleaning article with no load applied thereon. If the amount of the impregnated detergent is less than 50% by weight, the amount of the detergent supplied to the surface to be cleaned is less than necessary. If it exceeds 5000% by weight, an excess of detergent is supplied to the surface. The "amount of the impregnated detergent" as used herein refers to the weight percentage of the detergent to the weight of the cleaning article as measured under no load either after impregnation of the cleaning article with a detergent or after removing the excess of the detergent by squeezing. It is desirable that the cleaning article should have a detergent-impregnation capacity within the above-specified preferred range.

In order to sufficiently clean a surface of glass, etc., it is preferable for the detergent to contain solid abrasive particles. It is also preferable for the detergent to contain a component for forming a protective layer on the surface to be cleaned, i.e., a protective layer-forming component. It is still preferred for the detergent to contain both the solid abrasive particles and the protective layer-forming component. A detergent containing both components will hereinafter referred to as detergent A. To let such a preferred detergent having excellent detergency fully manifest its detergent performance, detergent A is impregnated into the cleaning article. The details of detergent A will be described below.

The solid abrasive particles to be incorporated into detergent A are those capable of abrading and removing dirt from a surface to be cleaned. More particularly, the solid abrasive particles mix with dirt on a surface to be cleaned thereby to release the dirt from the surface in a powdered state. The solid abrasive particles preferably comprise organic polymer particles and/or inorganic particles, and can be used either individually or as a combination of two or more. Preferred examples of the organic polymer particles and inorganic particles include (1) to (5) below:

(1) polymers obtained by polymerizing a monomer or monomer mixture containing an ethylenically unsaturated monomer such as alkyl acrylate, methacrylate, styrene, ethylene and propylene, (2) dimethylpolysiloxane having a high degree of polymerization (silicone rubber), (3) resins such as polyester, nylon, polycarbonate, polyacetal and a urethane resin, (4) an organopolysilsesquioxane (silicone resin) obtained by hydrolysis and condensation of a methyltrialkoxysilane or a partial hydrolyzate thereof and/or a partial condensate thereof in an aqueous solution of ammonia or an amine, and (5) water-insoluble inorganic substances such as silica, porous silica, soda-lime glass powder, diatomaceous earth, kaolinite, montmrillonite, hectorite, and bentonite.

Of the above-mentioned solid abrasive particles, those included in the above preferred examples and included under groups (2) or (4) are particularly preferred.

The solid abrasive particles preferably have an average primary particle size of 0.1 to 100 $\mu$m, particularly 1 to 10 $\mu$m, from the standpoint of spreadability of the detergent in wiping, mixing properties with dirt, dirt releasing properties, and wiping convenience with the detergent-impregnated article. The average primary particle size as used herein is a value obtained with a laser diffraction/scattering particle size analyzer (LA910 manufactured by Horiba Seisakusho). The solid abrasive particles preferably have a pencil hardness of 6B to 9H, particularly H to 8H, in order to prevent scratches to a general hard surface.

The solid abrasive particles are preferably present in detergent A in an amount of 0.1 to 30% by weight, particularly 1 to 10% by weight, still particularly 2 to 5% by weight. If the content of the solid abrasive particles is less than 0.1% by weight, sufficient detergent performance may not be manifested sometimes. If it exceeds 30% by weight, the detergent may be difficult to wipe off in dry wiping, tending to remain on the surface. Accordingly, the above range is preferred.

The protective layer-forming component which can be used in detergent A is capable of forming a protective layer on the surface after use of the detergent-impregnated article. Examples of such a protective layer-forming component include polyorganosiloxanes. Examples of the polyorganosiloxanes include silicone oil such as dimethylpolysiloxane, methylhydrogenpolysiloxane and methylphenylsilicone oil, fluorine-modified silicone oil, amino-modified silicone oil, epoxy-modified silicone oil, alcohol-modified silicone oil, and organic substance-modified silicone oil such as alkyl-modified silicone oil. The protective layer-forming component forms a layer (protective layer) on the surface to be cleaned to impart stain resistance to the surface. A protective layer-forming component which gives a static friction coefficient of 1.0 or less, particularly 0.5 or less, to the surface after dry wiping is particularly preferred. The above protective layer-forming components can be used either individually or as a combination of two or more.

The protective layer-forming component is preferably present in detergent A in an amount of 0.01 to 20% by weight, particularly 0.1 to 5% by weight, more particularly 0.1 to 1% by weight. If the content of the protective layer-forming component is less than 0.01% by weight, the detergent-impregnated article may tend to fail to form a sufficient protective layer on the surface, not imparting sufficient stain resistance. If it exceeds 20% by weight, the excess of the protective layer-forming component tends to leave streaks on the cleaned surface.

Detergent A preferably comprises water as a medium in order to secure spreadability on a surface to be cleaned, handling properties, and penetrability into the cleaning article. Water is preferably used in a proportion of 50 to 98.9% by weight, particularly 65 to 95% by weight, based on detergent A. If the water content is less than 50% by weight, the solid abrasive particles and the protective layer-forming component sometimes do not spread uniformly on a surface. If it exceeds 98.9% by weight, the amounts of the solid abrasive particles and the protective layer-forming component supplied to a surface may tend to be insufficient for cleaning.

Detergent A contains the aforesaid solid abrasive particles and protective layer-forming component, and if necessary, it can further contain other components. The amounts of the other components are decided appropriately so as to make detergent A 100% by weight as a whole. Examples of other components include surface active agents or alkalis for enhancing the detergency, lubricants for enhancing the lubricity, dispersants (e.g., thickening polysaccharides such as xanthan gum) for improving dispersibility of each component in detergent A, antifungals for preventing detergent A from molding, coloring materials (e.g. dye and pigment) and perfumes.

It is also desirable for detergent A to contain an organic solvent in view of detergency for oily stains, spreadability of the detergent in wiping, and removability of the dirt by wiping. One or more than one organic solvents can be used. Examples of the organic solvents are n-paraffin, kerosine, petroleum benzine, xylene, n-hexane, and cyclohexane.

The organic solvent is added to detergent A in an amount preferably of 0.05 to 60% by weight, more preferably 0.5 to 30% by weight, still more preferably of 0.5 to 10% by weight. If the content is less than 0.05% by weight, sufficient detergency against oil-soluble stains may not be manifested. If it exceeds 60% by weight, the excess of the organic solvent may tend to remain on the cleaned surface to give garish streaks.

It is also preferable for detergent A to contain a drying accelerator (e.g., ethanol) for improving the drying properties of detergent A after application to a surface. the drying accelerator is used in an amount preferably of 0.2 to 30% by weight, more preferably 5 to 30% by weight, still more preferably 5 to 25% by weight. If the content is less than 0.2% by weight, a sufficient drying accelerating effect may not be manifested. The content exceeding 30% by weight does not produce a corresponding increase in effect, which is uneconomical. Examples of the drying accelerator, other than ethanol, include isopropanol, propanol, butanol, methanol and a mixture of one or more of these alcohols and ethanol.

The detergent-impregnated article comprising the above cleaning article and detergent A impregnated therein is particularly effective in cleaning hard surfaces. When used for cleaning hard surfaces, such as glass, car bodies, car interiors, mirror, tiles, bathtubs, sinks, furniture such as cupboards, and household electric appliances, streaks are not left thereon after dry wiping so that there is no need to give another dry wipe.

The detergent-impregnated article comprising the above cleaning article and detergent A impregnated therein has a small dynamic friction coefficient on use and slides on a surface to be cleaned lightly. After dirt is released from a surface by the detergent-impregnated article, the surface can be wiped up lightly with a wiping sheet (a sheet for dry wiping) with a reduced dynamic friction coefficient. Therefore, dirt even on a large area can be removed with ease. When dirt released from a surface by use of the above detergent impregnated article is wiped away with a wiping sheet, the dynamic friction coefficient in the dry wiping is preferably 1 or less, more preferably 0.5 or less, still more preferably 0.4 or less. The wiping sheet to be used in dry wiping can be made up of, for example, the same material as used in the cleaning article.

The cleaned surface which is obtained by wiping off released dirt with a wiping sheet (i.e., the surface after dry wiping) has an extremely reduced static friction coefficient by the action of the protective layer formed by the protective layer-forming component. That is, the cleaned surface preferably has a static friction coefficient of 1.0 or less, particularly 0.5 or less. As a result, the cleaned surface will have a reduced dynamic friction coefficient and be wiped up more lightly even when it is necessary to give the cleaned surface another wipe with a wiping sheet, etc.

It is particularly preferable that, after the detergent-impregnated article is applied to the surface of a flat and transparent soda-lime glass plate (i.e., a hard surface) to supply detergent A, and dirt and detergent A on the surface are then wiped off with a wiping sheet, the cleaned surface has a static friction coefficient of 1.0 or less.

Such preferred dynamic and static friction coefficients are obtained by, for example, selecting the kind or concentration of the solid abrasive particles, the protective layer-forming component and, if necessary, other optional components to be contained in detergent A, or the amount of detergent A to be impregnated. The details for measurement of the dynamic and static friction coefficients will be described in detail in Examples hereinafter given.

Dirt can be released from a surface to be cleaned simply by giving a light wipe with the above detergent-impregnated article. Therefore, surfaces even in a high position that are difficult to wipe up can easily be cleaned by using the detergent-impregnated article (especially a sheet article) and/or a wiping sheet attached to a head of a cleaning tool. For example, the cleaning tool is composed of a flat head to which the detergent-impregnated article (especially a sheet article) can be attached and a stick connected to the head via a universal joint. The detergent-impregnated article is fixed to the head by means of a plurality of flexible parts each having radial slits.

Figure 5A:
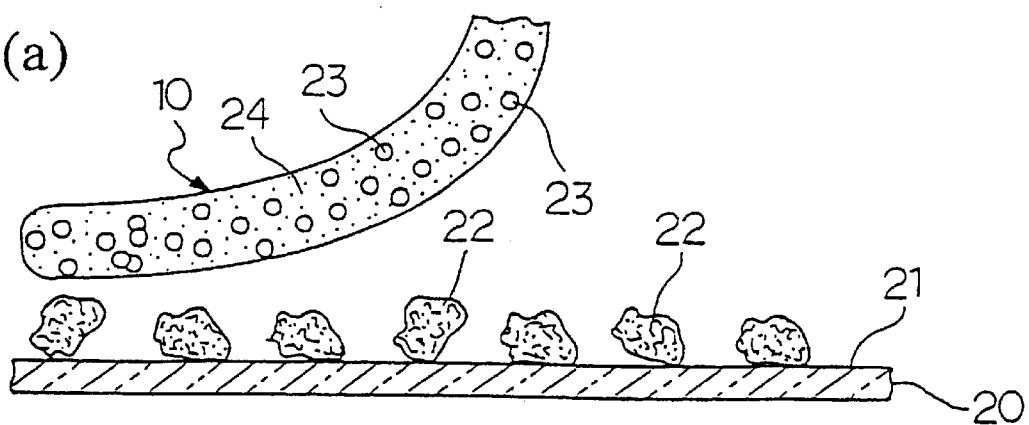
FIG. 5(a), FIG. 5(b) and FIG. 5(c) schematically illustrate a method for cleaning glass surface with the detergent-impregnated article comprising the cleaning article shown in FIG. 1 and a detergent impregnated therein.
Figure 5B:
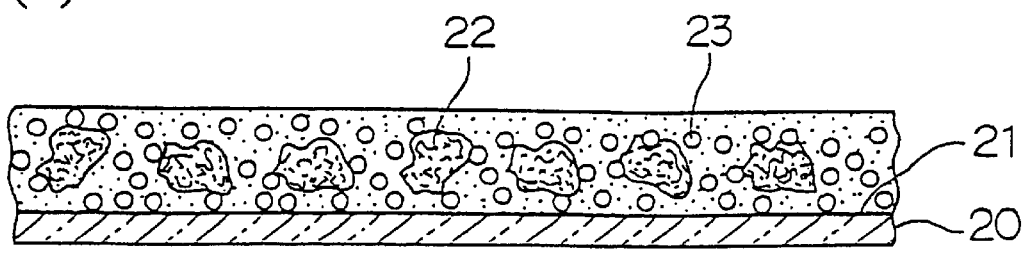
Figure 5C:
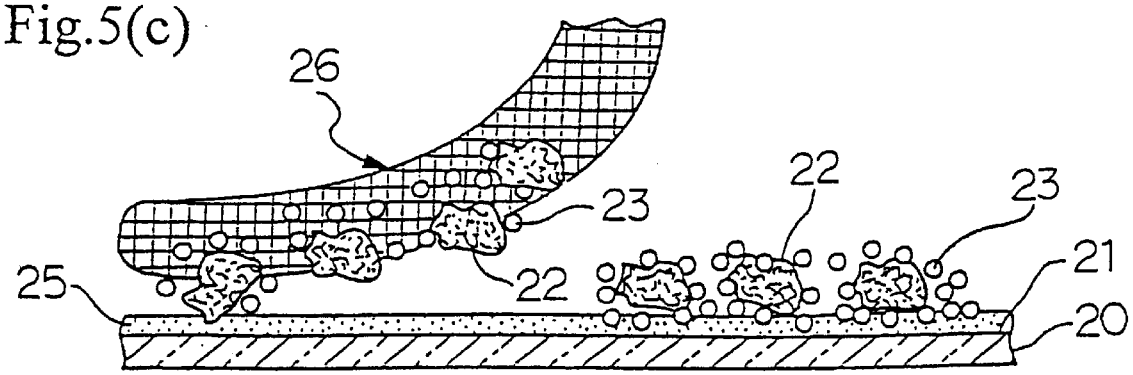

The cleaning method using the detergent-impregnated article comprising the above cleaning article and a detergent impregnated therein will be described with reference to the example of cleaning a glass surface with the cleaning article of FIG. 1 and detergent A impregnated therein. Reference is made to FIGS. 5(a) to (c), which schematically illustrates the method for cleaning a glass surface using the cleaning article and a detergent impregnated therein.

In this cleaning method, the greatest characteristic resides in that the glass surface can be cleaned with the detergent-impregnated article alone without using a large amount of water or liquid such as a detergent other than the impregnated detergent A. That is, in cleaning glass, the surface 21 of glass 20 to be cleaned is directly wiped with the detergent-impregnated article 10 to supply detergent A to the surface as shown in FIG. 5(a), whereby, as shown in FIG. 5(b), dirt 22 present on the surface 21 mixes with solid abrasive particles 23 in detergent A and is thus released from the surface 21 in a powdery form. As another example not shown, oily stains mix with the organic solvent such as n-paraffin, that is added to detergent A as needed, and are thus oily stains are released from the surface 21. At the same time, the protective layer-forming component 24 of detergent A coats the surface 21.

After the detergent is applied and it is allowed to stand for about 30 seconds to 5 minutes, the released powdery dirt 22 is dry wiped off with a wiping sheet 26 such as dry cloth, paper (e.g., wipes or kitchen towel) or nonwoven fabric, as shown in FIG. 5(c). Being in a powdery state, the dirt can be wiped away easily, without leaving streaks. On the cleaned surface 21 there remains a protective layer 25 comprising the protective layer-forming component 24. Thus, the cleaned surface 21 exhibits stain resistance and reduced friction owing to the protective layer 25, which keeps the surface clean and allows easy cleaning next time.

While the cleaning article of the present invention and the detergent-impregnated article of the present invention have been described with reference to its preferred embodiments, the present invention is not deemed to be limited thereto, and various changes and modifications can be made therein without departing from the spirit and scope of the present invention.

For example, in the cleaning article shown in FIG. 23, both ends of the releasing layer 102a and those of the releasing layer 102b may be bonded together instead of providing the releasing layers 102c and 102d which support the retaining layer 101 from both sides.

In the cleaning article shown in FIG. 2, the releasing layer enclosing the retaining layer 101 does not need to be a single continuous sheet, and two pairs of releasing layers may be used to enclose the retaining layer.

Furthermore, the form of the cleaning article is not limited to a sheet form and can be a column form such as a cylinder or a polygon, or a rectangular hexagon. Where a cleaning article of column form or rectangular hexagonal form is used, the volume proportion of the retaining layer in the cleaning article can be increased as compared with a cleaning article of sheet form, thereby increasing the amount of an impregnated detergent.

The effectiveness of the cleaning article of the present invention and the detergent-impregnated article of the present invention will now be demonstrated by way of Examples, but it should be understood that the present invention is not construed as being limited thereto. Unless otherwise noted, all the percents are given by weight.

EXAMPLES 1 TO 5 AND COMPARATIVE EXAMPLE 1

Formulation of Detergent

The following components were formulated in the ratio shown below to prepare detergent (1).

| | |
|---|---|
| Silicone resin (solid abrasive particles) (average particle size: 2 μm) | 3% |
| Dimethylpolysiloxane (protective layer-forming component) | 0.5% |
| n-Paraffin (organic solvent) | 2% |
| Dodecyl glucoside (nonionic surface active agent; degree of glucose condensation: 1.35) | 0.50% |
| Xanthan gum (dispersant) | 0.08% |

-continued

| | |
|---|---|
| Ethanol (drying accelerator) | 20% |
| Ion-exchanged water | balance |

Containing ethanol in a prescribed amount, the resulting detergent had an accelerated rate of drying.

Detergents (1-a) and (1-b) were prepared in the same manner as for detergent (1), except no silicone resin was used in detergent (1-a) and no dimethylpolysiloxane in detergent (1-b).

Preparation of Sheet for Detergent Impregnation

Hydrophobic thermal bonded nonwoven fabric manufactured by an air-laying method (a product of Chisso Corp.; made of PP/PE core/sheath type conjugated fiber having a fineness of 10 deniers; basis weight:55.5 g/m$^2$; density under 2.5 g/cm$^2$ load:0.02 g/cm$^3$) was used as a retaining layer. Hydrophilic spun laced nonwoven fabric made of cotton ("Gotto Ace" produced by Unitika Ltd.; basis weight:39.2 g/m$^2$; density under 2.5 g/cm$^2$ load:0.11 g/cm$^3$) was used as a gradual-releasing layer. The retaining layer was sandwiched in between a pair of releasing layers, and the three layers were joined by means of a heat sealer to prepare a sheet for detergent impregnation having a sandwich structure (total basis weight:13.9 g/m$^2$; dimensions:24 cm×27 cm/sheet). The heat sealing was given to the peripheral four edges and the two diagonals. The resulting sheet is designated Sheet A.

Hydrophobic thermal bonded nonwoven fabric manufactured by an air-through method (a produce of Chisso Corp.; made of PP/PE core/sheath type conjugated fiber having a fineness of 3 deniers; basis weight:30 g/m$^2$; density under 2.5 g/cm$^2$ load:0.018 g/cm$^3$) followed by steel matched embossing was used as a retaining layer. Hydrophobic melt town nonwoven fabric made of PP fibers (a product of Mitsui Chemical Industries, Ltd.; fiber diameter:3 μm; basis weight: 15 g/m$^2$; density under 2.5 g/cm$^2$ load:0.17 g/cm$^3$) was used as a gradual-releasing layer. The retaining layer was sandwiched in between a pair of releasing layers, and the three layers were joined by means of a heat sealer to prepare a sheet for detergent impregnation having a sandwich structure (total basis weight:60 g/m$^2$; dimensions:24 cm×27 cm/sheet). The resulting sheet is designated Sheet B.

Hydrophobic spun bonded nonwoven fabric comprising PP fibers manufactured by an air-through method (a product of Mitsui Chemical Industries, Ltd.; fineness:3deniers; basis weight:50 g/m$^2$; density under 2.5 g/cm$^2$ load:0.025 g/cm$^3$) followed by steel matched embossing was used as a retaining layer. Hydrophobic melt blown nonwoven fabric comprising PP fibers (a product of Mitsui Chemical Industries, Ltd.; fiber diameter: 3 μm; basis weight:15 g/m$^2$; density under 2.5 g/cm$^2$ load:0.17 g/cm$^3$) was used as a gradual-releasing layer. The retaining layer was sandwiched in between a pair of releasing layers, and the three layers were joined by means of a heat sealer to prepare a sheet for detergent impregnation having a sandwich structure (total basis weight:80 g/m$^2$; dimensions:24 cm×27 cm/sheet). The resulting sheet is designated Sheet C. For comparison, two-ply sheet of commercially available kitchen towel (dry-processed pulp sheet produced by HAVIX; basis weight: 55 g/m$^2$; density under 2.5 g/cm$^2$ load: 0.06 g/cm$^3$) were used (total basis weight: 110 g/m$^2$; dimensions: 24 cm×27 cm/sheet), which sheet is designated as Sheet D.

Preparation of Detergent-Impregnated Sheet

A sheet for detergent impregnation and a detergent were combined as shown in Table 1 below. A sheet was impregnated with the detergent by immersion. After thorough impregnation, the sheet was taken out, and the excessive detergent was removed by squeezing to obtain a detergent-impregnated sheet. The amount of impregnated detergent of each sheet was 350 to 650% based on the weight of the sheet.

The detergent performance of the resulting detergent-impregnated sheets was examined as follows. A flat and transparent soda-lime glass plate (hereinafter referred to as glass for evaluation) which had been thoroughly cleaned by washing with water was allowed to stand in a north side of a building and kept out of rain for 3 months. The surface of the glass was wiped with the detergent-impregnated sheet. After drying, the surface was dry wiped up with kitchen towel (a dry-processed pulp sheet available from HAVIX; basis weight:55 g/m$^2$; density under 2.5 g/cm$^2$ load:0.06 g/cm$^3$). The dynamic friction coefficient in this dry wiping was measured in accordance with the method described below. The surface of the glass surface after dry wiping with kitchen towel was observed to evaluate streaks based on the following rating system. The static friction coefficient of the glass surface after dry wiping was measured according to the method described below. Further, the stain resistance of the glass surface after dry wiping was evaluated in accordance with the following method.

In addition, the releasability of the detergent from the detergent-impregnated sheet (i.e., rate of release and uniformity in release) were evaluated according to the following method. The results obtained are shown in Table 1 below.

<Measurement of Dynamic Friction Coefficient>

The surface of the glass for evaluation having been allowed to stand under the above-described conditions for 3 months was wiped with the detergent-impregnated sheet to uniformly supply 3 g/m$^2$ of the detergent. After the detergent dried (about 3 minutes later), a sheet of kitchen towel (dry-processed pulp sheet produced by HAVIX), cut into a disk of 6 cm in diameter, was placed thereon and slid horizontally at a speed of 3 cm/sec under a load of 1.3 kg. The force F required for this sliding was measured to obtain a dynamic friction coefficient according to equation (2):

$$\text{Dynamic friction coefficient} = F(\text{kg weight})/1.3(\text{kg weight}) \quad (2)$$

<Evaluation on Degree of Streaks>

A reduction in gloss due to streaks was made use of. The gloss of the cleaned glass surface was measured at 85° with a glossimeter (9M-268 manufactured by Minolta). The greater the measured gloss, the lesser the streaks. At a gloss of 110 or less, the streaks are observable with the naked eye. The initial gloss of the surface before standing outdoors (i.e., the clean surface) was 115.

<Measurement of Static Friction Coefficient>

The static friction coefficient of the cleaned glass surface was measured with a friction meter (HEIDON Tribo gear μs Type 94i manufactured by Shinto Kagaku K.K.), with a sheet of kitchen towel (a dry-processed pulp sheet produced by HAVIX) being set on the measuring part thereof. An average of the measured values (n=5) was obtained.

The static friction coefficient of the glass for evaluation after standing under the above-described conditions for 3 months was 1.45, and that before standing (i.e., the clean surface) was 0.52. Somewhat varying depending on the weather during the standing period and the surface conditions of the glass, these values should be taken as guides to evaluation.

<Evaluation on Stain Resistance>

After standing under the above conditions for 3 months, the glass for evaluation was wiped up with the detergent-impregnated sheet. Then the detergent on the surface was wiped off with kitchen towel (a dry-processed pulp sheet produced by HAVIX) to prepare a surface for evaluation.

The static friction coefficient (A) of the glass surface for evaluation was measured immediately after the preparation according to the above method. After the measurement, the glass was again allowed to stand under the same conditions for 3 months, and the static friction coefficient (B) was again measured.

For control, the same glass as that for evaluation was allowed to stand under the same conditions for 3 months and thoroughly washed with water to prepare a control surface. The static friction coefficient (C) of the control surface (≈0.52) was measured in the same manner as described above. After the measurement, the glass for control was again allowed to stand under the same conditions for 3 months, and the static friction coefficient (D) (≈1.45) was measured in the same manner as described above.

The degree of staining was calculated from the measured values A, B, C, and D according to equation (3). Degrees of staining of 30% or less, preferably 20% or less, indicate that the stain resistance can be confirmed visually.

$$\text{Degree of staining}(\%) = (B-A)/(D-C) \times 100 \quad (3)$$

<Evaluation of Detergent Releasability (Rate of Release and Uniformity of Release)>

A side of a flat and transparent soda-lime glass plate having an area of 0.53 m$^2$ was given one wiping operation with a detergent-impregnated sheet (a detergent-impregnated sheet of 24 cm×27 cm was used as folded in six). The weight loss of the detergent-impregnated sheet was measured to obtain the amount of the detergent released per wipe (g/m$^2$-glass surface). Wiping operations with respect to other glass plates were repeated with use of the detergent-impregnated sheet which had been folded in six. In each wiping operation, a fresh surface of the sixfold sheet was used. When no detergent was supplied from the detergent-impregnated sheet to the glass surface, the total amount of the detergent released was measured, from which the rate of detergent release was obtained according to the above equation (1).

An average amount of the detergent released per sheet of glass (g/m$^2$-glass) was obtained. Also, the number of the sheets of glass that could be cleaned and the amount of the detergent released per sheet of glass (g/m$^2$-glass) were plotted on x–y coordinates, and the uniformity of the detergent release was evaluated from the slope of the approximate line obtained by the method of least squares. As the uniformity of release becomes higher, the slope approaches zero.

TABLE 1

| Example No. | Sheet for Dergent Impregnation | Detergent | Rate of Detergent Release (%) | Average Amount of Released Detergent (g/m$^2$) | Cleanable Area (m$^2$) | Uniformity of Detergent Release | Dynamic Friction Coefficient in Wiping | Streaks (gloss) | Static Friction Coefficient of Cleaned Surface | Degree of Staining (%) |
|---|---|---|---|---|---|---|---|---|---|---|
| Example 1 | A | (1) | 73.1 | 2.5 | 8.5 | −0.25 | 0.20 | 114 | 0.25 | 17 |
| Example 2 | B | (1) | 76.0 | 2.3 | 8.0 | −0.24 | 0.20 | 114 | 0.25 | 17 |
| Example 3 | A | (1-a) | 73.9 | 2.6 | 8.4 | −0.22 | 0.50 | 110 | 0.30 | 21 |
| Example 4 | A | (1-b) | 73.2 | 2.4 | 8.3 | −0.24 | 0.20 | 114 | 0.58 | 93 |
| Example 5 | C | (1) | 75.8 | 2.3 | 8.1 | −0.23 | 0.20 | 114 | 0.25 | 17 |
| Compara. Example 1 | D | (1) | 53.6 | 3.4 | 4.8 | −0.78 | 0.20 | 114 | 0.25 | 17 |

EXAMPLE 6 AND COMPARATIVE EXAMPLE 2

The following components were formulated in the ratio shown below to prepare detergent (2).

Formulation of Detergent

| | |
|---|---|
| Silicone resin (solid abrasive particles) (average particle size: 2 μm) | 5% |
| Dimethylpolysiloxane (protective layer-forming component) | 2% |
| n-Paraffin (organic solvent) | 7% |
| Dodecyl glucoside (nonionic surface active agent; degree of glucose condensation: 1.35) | 0.20% |
| Xanthan gum (dispersant) | 0.10% |
| Ethanol (drying accelerator) | 2% |
| Ion-exchanged water | balance |

Preparation of Sheet Detergent Impregnation

Hydrophobic thermal bonded nonwoven fabric manufactured by an air-laying method (a product of Chisso Corp.; made of PP/PE core/sheath type conjugated fiber having a fineness of 10 deniers; basis weight:158 g/m$^2$; density under 2.5 g/cm$^2$ load:0.02 g/cm$^3$) was used as a retaining layer. Hydrophilic spun laced nonwoven fabric made of regenerated cotton (BEMLIESE™ JP384 produced by Asahi Chemical Industry Co., Ltd.; basis weight:39.5 g/m$^2$; density under 2.5 g/cm$^2$ load:0.112 g/cm$^3$) was used as a gradual-releasing layer. The retaining layer was sandwiched in between a pair of releasing layers, and the three layers were joined by means of a heat sealer to prepare a sheet for detergent impregnation having a sandwich structure (total basis weight:237 g/m$^2$; dimensions:24 cm ×27 cm/sheet). The heat sealing was given to the peripheral four edges. The resulting sheet is designated Sheet E. The sheet D was used as a comparative sheet for detergent impregnation.

Preparation of Detergent-Impregnated Sheet

A sheet for detergent impregnation and a detergent were combined as shown in Table 2 below. The sheet was impregnated with the detergent by immersion. After thorough impregnation, the sheet was taken out, and the excess detergent was removed by squeezing to obtain a detergent-impregnated sheet. The amount of the impregnated detergent of each sheet was 450 to 1,050% based on the weight of the sheet.

The detergent releasability (rate of release and uniformity of release) of the resulting detergent-impregnated sheet was measured and evaluated in the same manner as in Example 1, except that the hood (bonnet) of a car ("Selvo" manufactured by Suzuki Motor Corp.) that had not been washed for 1 month was used as a surface to be cleaned. The results obtained are shown in Table 2.

TABLE 2

| Example No. | Sheet for Detergent Impregnation | Detergent | Rate of Detergent Release (%) | Average Amount of Released Detergent (g/m$^2$) | Cleanable Area (m$^2$) | Uniformity of Detergent Releaae |
|---|---|---|---|---|---|---|
| Example 6 | E | (2) | 73.6 | 7.0 | 7.8 | −0.75 |
| Compara. Example 2 | D | (2) | 65.8 | 8.1 | 6.1 | −1.90 |

As is apparent from the results shown in Tables 1 and 2, the detergent-impregnated sheets of Examples 1 to 6 (the present invention), which comprises a sheet for detergent impregnation having a retaining layer and releasing layers and a detergent impregnated in the sheet, release the detergent uniformly at an excellent rate of release as compared with the comparative detergent-impregnated sheets.

Where a detergent containing solid abrasive particles and a protective layer-forming component is used (Examples 1, 2, and 6), particularly improved detergent performance is exhibited.

Industrial Applicability

According to the present invention, the cleaning article used by impregnating a detergent uniformly releases a properly controlled amount of the detergent when it is used by impregnating a detergent. The detergent can be used at a high utilization efficiency (i.e., excellent rate of release), whereby dirt can be wiped off from a wide area. The detergent-impregnated article comprising the cleaning article and a detergent impregnated therein also exhibits the same advantageous effect.

In particular, with use of a specific detergent for impregnation and without use of water, dirt can be removed by giving a light wipe without leaving streaks after dry wiping so that the necessity of giving another dry wipe is excluded. Further, excellent stain resistance to the cleaned surface and easier wiping off dirt from a large area can be attained.

What is claimed is:

1. A cleaning article comprising a detergent-retaining layer containing a hydrophobic material and detergent gradual-releasing layers having a higher density than said detergent-retaining layer, said detergent-retaining layer being sandwiched between said detergent gradual-releasing layers;

wherein said detergent-retaining layer has a density of 0.005 to 0.5 g/cm$^3$ under a load of 2.5 g/cm$^2$ and contains a fiber aggregate comprising hydrophobic fibers as a major component, said detergent gradual-releasing layers have a density of 0.001 to 1.0 g/cm$^3$ under a load of 2.5 g/cm$^2$ and contain fiber aggregate comprising hydrophilic fibers as a major component, and a difference in density between each of the detergent gradual-releasing layers and the detergent-retaining layer (former-latter) being from 0.005 to 0.95 g/cm$^3$; and wherein the cleaning article is wet, being impregnated with 50 to 5000% by weight of a detergent based on the weight of said cleaning article with no load applied thereon.

2. The cleaning article according to claim 1, wherein the detergent gradual-releasing layers fiber aggregate comprising hydrophilic fibers contains therein hydrophobic ultrafine fibers having a fiber diameter of not greater than 10 μm.

3. The cleaning article according to claim 1, wherein said detergent-retaining layer comprises a hydrophobic non-woven fabric having a plurality of convex and concave portions regularly arranged.

4. The cleaning article according to claim 1, wherein said cleaning article is in a sheet form, said detergent-retaining layer has a basis weight of 5 to 300 g/m$^2$, and said detergent gradual-releasing layers each have a basis weight of 1 to 200 g/m$^2$.

5. The cleaning article according to claim 1, wherein said cleaning article is in a column form or a rectangular hexagonal form.

6. The cleaning article according to claim 1, wherein said detergent is a detergent for a hard surface.

7. The cleaning article according to claim 6, wherein said detergent comprises solid abrasive particles.

8. The cleaning article according to claim 6, wherein said detergent comprises a protective layer-forming component.

9. The cleaning article according to claim 6, wherein said detergent comprises solid abrasive particles and a protective layer-forming component.

* * * * *